Figure 1:
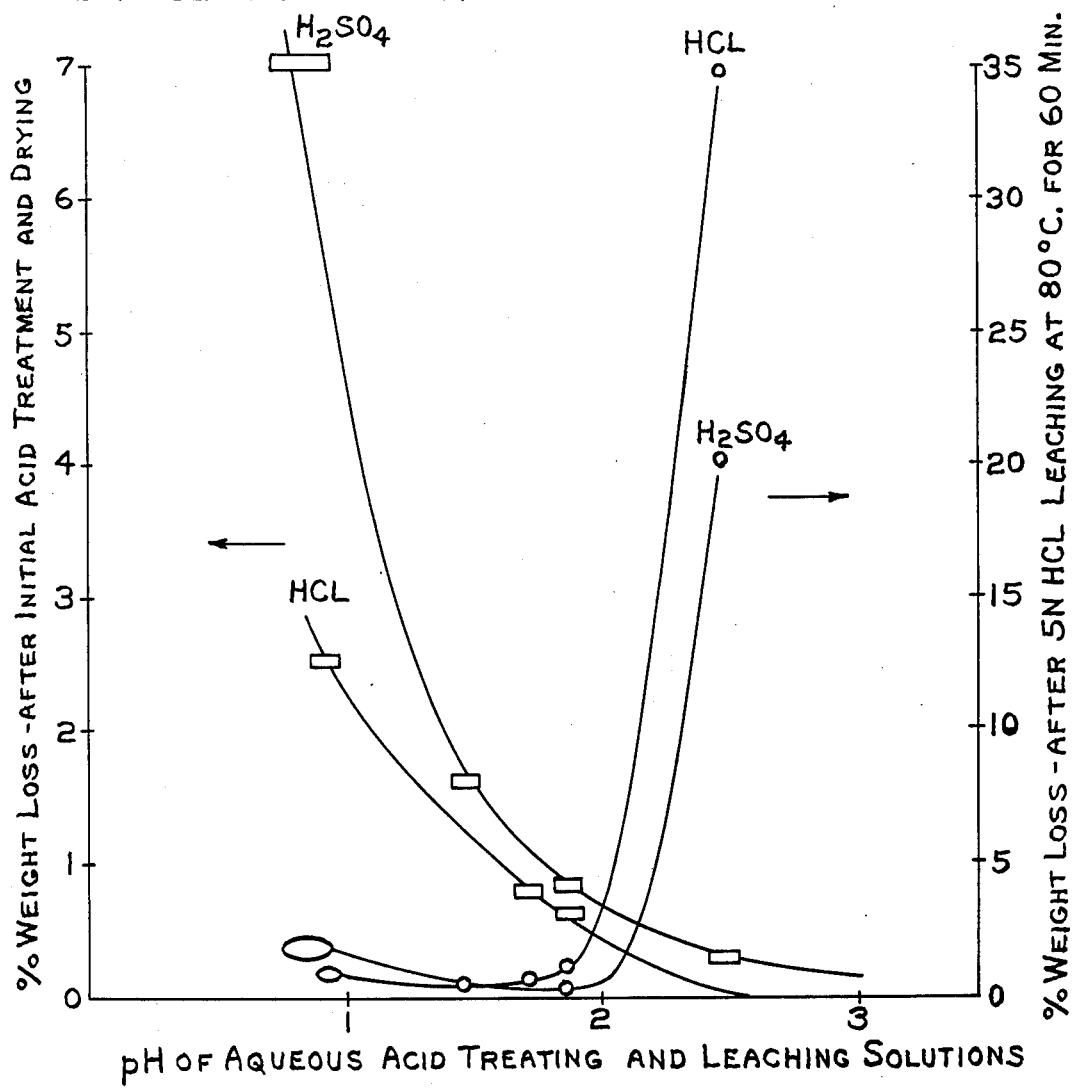
Figure 2:
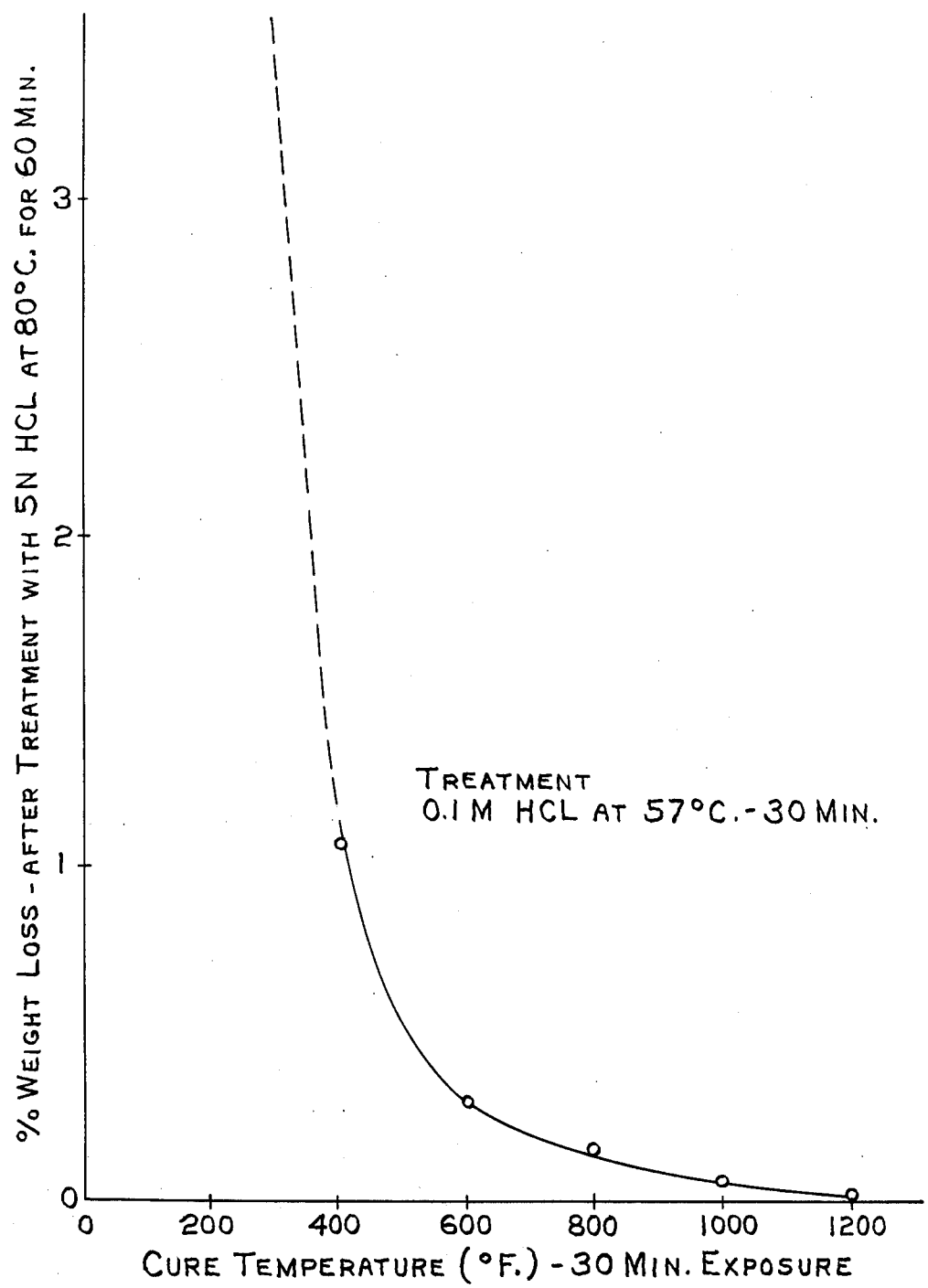

United States Patent [19]

Zlochower

[11] 4,063,001

[45] Dec. 13, 1977

[54] METHOD OF PREPARING ACID RESISTANT GLASS FIBERS

[75] Inventor: Isaac A. Zlochower, Pittsburgh, Pa.

[73] Assignee: PPG Industries, Inc., Pittsburgh, Pa.

[21] Appl. No.: 685,854

[22] Filed: May 13, 1976

Related U.S. Application Data

[60] Division of Ser. No. 566,471, April 9, 1975, abandoned, which is a continuation-in-part of Ser. No. 455,471, March 27, 1974, abandoned.

[51] Int. Cl.$^2$ .................... C03C 25/06; C03C 13/00
[52] U.S. Cl. .................................... 428/410; 106/50; 156/663
[58] Field of Search ................... 427/309; 156/24; 106/50; 428/410

[56] References Cited

U.S. PATENT DOCUMENTS

| | | | |
|---|---|---|---|
| 2,337,460 | 12/1943 | French ................................. | 427/309 |
| 2,461,841 | 2/1949 | Nordberg .......................... | 156/24 X |
| 2,494,259 | 1/1950 | Nordberg .............................. | 106/50 |
| 2,686,954 | 8/1954 | Parker ................................. | 156/24 X |
| 3,259,517 | 7/1966 | Atwell ............................... | 156/24 X |
| 3,687,850 | 8/1972 | Gagin ................................. | 106/50 X |

*Primary Examiner*—James R. Hoffman
*Attorney, Agent, or Firm*—John E. Curley

[57] ABSTRACT

Acid resistant glass fibers are prepared by treating the surface of a siliceous glass fiber with an aqueous acid solution to increase the silica content thereof. The aqueous acid solution is removed from the surface of the glass fibers and the fibers are heated to dehydrate or partially dehydrate the surface. The glass fibers as produced have a dual composition; the outer surface of the fiber is rich in silica in relation to the core of the fiber. The fibers so formed are highly resistant to acid attack.

12 Claims, 2 Drawing Figures

METHOD OF PREPARING ACID RESISTANT GLASS FIBERS

This application is a division of application Ser. No. 566,471, filed Apr. 9, 1975 which is a continuation-in-part of application Ser. No. 455,471, filed Mar. 27, 1974, both now abandoned.

BACKGROUND OF THE INVENTION

1. Field of the Invention

This invention relates to acid resistant glass fibers and a method of forming the same.

2. Description of the Prior Art

Glass fibers are formed by attenuating molten cones of glass from a bushing having a plurality of orifices. The single glass fibers or filaments formed are continuous and generally cylindrical having a diameter of about $1 \times 10^{-5}$ inches to about $1.0 \times 10^{-3}$ inches.

After formation, the filaments are sized with an aqueous sizing composition which lubricates the filaments to prevent damage due to abrasion of the filaments against each other during subsequent processing. The sizing composition typically contains a binder which causes the filaments to adhere together when they are formed into strands by gathering in the conventional manner.

These strands can then be formed into yarns, cords or other like materials depending on the final use intended for the glass fibers.

A typical glass fiber composition, hereinafter referred to as "621" glass, being of the "E" glass family, has a typical composition as follows:

| Components | Percent |
|---|---|
| $SiO_2$ | 53.7 |
| $Al_2O_3$ | 13.4 |
| $CaO$ | 21.1 |
| $B_2O_3$ | 8.8 |
| $Fe_2O$ | 0.2 |
| $MgO$ | 0.4 |
| $TiO_2$ | 0.6 |
| $Na_2O$ | 0.6 |
| $F_2$ | 1.4 |

The "621" glass composition typified by the above formulation is used to form fibers which have a plurality of uses. The "621" glass composition also has the advantage of having a low melting point and a low liquidus temperature which allows the glass fibers formed therefrom to be melted, refined and to undergo other processing with relative ease in handling.

There are a plurality of known glass fiber compositions; most compositions have a major portion as $SiO_2$, usually about 50 to 70 percent by weight, however greater or lesser amounts of $SiO_2$ may be used in the glass fiber compositions for unique applications. The other substances which may be present in the glass composition are $Li_2O$, $Na_2O$, $K_2O$, $BeO$, $MgO$, $CaO$, $BaO$, $TiO_2$, $ZrO_2$, $MnO$, $Fe_2O_3$, $NiO$, $CuO$, $AgO$, $ZnO$, $B_2O_3$, $Al_2O_3$, $F_2$, $WO_3$, $CeO_2$, $SnO_2$, and the like. The selection of a particular glass composition is made in accordance with the desired processing characteristics and the final properties of the glass fibers desired for a particular use.

Glass fibers in the form of cloth have found particular utility as filter bags to be used for filtering high temperature gases from industrial stacks. These gases contain many corrosive materials. For example, a stack gas produced from a coking process contains water vapor and $SO_3$ which forms sulfuric acid. The sulfuric acid attacks the surface of the glass fibers causing reduced filter bag life, hence, necessitating replacement of the filter bags at very short intervals. Thus, it is desired that acid resistant glass fibers be economically produced so that they may be utilized in the filtration of corrosive liquids and gases.

An additional use of glass fibers is for the reinforcement of resinous materials. Typically, glass fibers in the form of cloth, mat, strand, or yarn are impregnated with a resinous solution which is hardened to form a generally rigid article. The glass fibers provide strength to the article because their tensile strength is substantially greater than the plastic material forming the resin matrix. These fiber reinforced plastics have found utility when fabricated as storage tanks for a plurality of materials. In some instances, the materials to be stored are corrosive in nature, having a highly acidic character, and therefore have a tendency to attack the glass fibers, thereby reducing the life of the storage tanks. Therefore, it has been desired to have glass fibers which are resistant to attack by acidic media for glass fiber reinforced storage tanks.

In accordance with the instant invention, an acid resistant glass fiber and a process for producing an acid resistant glass fiber is provided.

DESCRIPTION OF THE INVENTION

The method of producing the acid resistant glass fiber involves contacting the glass fibers with an aqueous acid solution to increase the silica content of the glass fiber surface. This aqueous acid solution dissolves the alkali metal oxides, alkali earth metal oxides and other oxides from the fiber surface, thus providing a hydrated silica and silica rich surface layer. The acid solution with the dissolved acid soluble oxides which were previously on the surface of the glass fiber are removed by rinsing with water or a like effective method. The glass fiber is then heated to provide an acid resistant surface on the glass fiber. Thus, a glass fiber having a dual composition in which the surface of the fiber has a high silica content in relation to the core of the fiber is produced.

The glass fibers useful in the practice of the invention are generally those having 40 to 75 percent $SiO_2$ present therein. The balance of the composition is constituted of other glass components known to those skilled in the art. A major portion of the components in addition to $SiO_2$ must be capable of being leached by the acid solution as will be further described herein. The leachable components typically are, but not limited to, the alkali metal oxides such as $Li_2O$, $Na_2O$, $K_2O$, and the like; The alkaline earth metal oxides such as $MgO$, $CaO$, and the like; the nontransition metal oxides such as $B_2O_3$, $Al_2O_3$ and the like; and the halogens such as $F_2$, $Cl_2$ and the like. Additionally, the transition metal oxides may be used to the extent that they are leachable by the acid solutions or do not interfere with the leaching of other acid solution components.

An advantageous glass fiber composition useful in the practice of the invention is the "621" glass composition, hereinabove described, which readily forms glass fibers having high tensile strength, generally commercially acceptable properties, and which entails a minimum of processing problems in forming and handling. Additionally, the "621" glass composition, due to the presence of the alkali metal oxides, the alkaline earth metal oxides and the $B_2O_3$, is readily leachable by aqueous acid solutions. Thus, treating fibers formed of this glass in accordance with the instant teaching, an acid resistant fiber can be produced with minimal processing time. Other glass fibers formed of different compositions than the "621" glass composition, may also be used in practicing this invention with some variations in the conditions employed in accordance with the process of the invention.

Useful aqueous acid solutions employed in the instant invention are those acid solutions which are capable of leaching the leachable components of the glass fiber. Because the leaching process is dependent on the pH of the acid solution, the temperature of the acid solution and the strength of the acid employed, some acid solutions are more efficient than others. The strong mineral acids such as HCl, $HNO_3$, $H_2SO_4$ and the like, in solutions having a pH from about 1 to 2, are particularly effective. These acids will leach the surface of the glass fiber effectively in a relatively short period of time at a low solution temperature (about 40°-90° C.). Additionally, the heating process to provide the acid resistant surface is substantially reduced when these strong acids are used. However, weaker acids such as acetic acid, propionic acid, and the like are effective in a pH range of 1-2 at 40°-90° C. as leaching agents. Generally, as the strength of the acid solution employed is reduced, the time necessary for effective leaching is increased and the temperature required for effective leaching is also increased. The heating temperature for providing an acid resistant surface may also be increased along with the time necessary to produce the acid resistant effect where weak acids are employed rather than strong ones. Therefore, it can be seen that virtually any acid solution can be used to leach the leachable components of the glass fiber composition to produce the acid resistant fibers of the invention.

It has been found that some acids do not produce the desired effect. For example, oxalic acid, alone, in solution is not an effective leaching agent for glass fibers. It is believed that the non-utility of oxalic acid is due to its characteristic of reacting with calcium ions in the glass. The reaction product is believed to be not being capable of being removed from the surface of the glass fibers; by rinsing or a like method. Thus, it is believed that when the glass fiber is heated and the water is removed from the surface thereof, the oxalates are formed which substantially detract from the acid resistance and strength of the treated glass fiber.

In addition to the acid components in the aqueous acid solution, other ions may be present so long as the acidity of the solution is maintained. For example, solutions of $Fe(NO_3)_3$, $K_2Cr_2O_7$, $Co(NO_3)_2$, $ZnCl_2$, $Al(NO_3)_3$, and like salts in solution are effective leaching agents if the proper acidity is maintained by the addition of an acidic reagent where necessary. The conjugate acid-base salts, as above recited, are merely exemplary of the type of compounds useful to produce an acidic media in which glass fibers can be treated to produce the acid resistant glass fibers of the invention. In some cases, the addition of these salts may enhance the acid resistant characteristics of the treated fibers. The compounds useful for producing acidic solutions in the context of the invention are only limited by their capacity to produce acidity and to be removed from the surface of glass fibers during the rinsing step to be further described. Hence, a plurality of compounds may be used in aqueous solution to produce the aqueous acid solution contemplated in the practice of the invention.

After the fibers are contacted with the acid solution, and the silica content of the glass fiber surface is increased, the treated fibers are then rinsed free of the previously applied aqueous acid solution. The normal method by which the acid solution is removed is by rinsing with water. However, other methods of rinsing may be used and different rinsing media may be employed so long as adequate removal of the aqueous acid solution is provided.

After the treated fibers are rinsed, they are heated at a temperature adequate to provide an acid resistant surface to the fiber. The time and temperature of this heating step is contingent upon the acid media used, the concentration of acid media in the aqueous solution and the temperature and time at which the fibers are treated in the aqueous acid solution.

It is hypothesized that the acid solution leaches out the acid soluble portion of the glass composition at the surface of the fiber, hence leaving a surface rich in silica, hydrated silica and combinations thereof. On heating of the fiber any hydrated silica is dehydrated and is converted to a matrix of Si-O-Si bonds. This is unlike the prior art method of leaching an entire glass fiber and reconsolidating by heating to the vitrification temperature of the silica. Temperatures contemplated in the practice of the instant invention are below that of the revitrification temperature of $SiO_2$.

The maximum weight loss of the treated glass fiber is about 10 percent and preferably less than 5 percent to obtain a fiber with adequate tensile strength.

A typical glass fiber composition range in percent by weight is:

52 – 58 as $SiO_2$
12 – 20 as $Al_2O_3$
12 – 25 as CaO
0 – 8 as MgO
0 – 13 as $B_2O_3$
0 – 3 as $Na_2O$ + $K_2O$
0 – 1 as $F_2$

Hence, the leachable constituents in the composition range from 22 to 36 percent as CaO, MgO, $B_2O_3$, $Na_2O$ and $K_2O$. Therefore, when up to 10 percent by weight of the glass fiber is removed by the treatment of the invention, the total glass fiber composition range in percent by weight is:

52 – 64 as $SiO_2$
12 – 22 as $Al_2O_3$
12 – 36 as CaO + MgO + $B_2O_3$ + $Na_2O$ + $K_2O$ + $F_2$

When less than 5 percent weight loss is encountered during treatment, the fiber of the aforementioned composition has a total composition range in percent by weight of:

52 – 61 as $SiO_2$
12 – 21 as $Al_2O_3$
18 – 36 as CaO + MgO + $B_2O_3$ + $Na_2O$ + $K_2$ + $F_2$

The treatment can be extremely mild so that very small weight losses are encountered (i.e., less than 1 percent) as to show virtually no change in the total glass fiber composition.

It is believed that the silica rich layer provides a barrier to acid attack. Also because the silica layer is at the surface, the tensile strength and general physical characteristics of the acid resistant fibers in some cases differs slightly from the starting fiber.

The previous description of the invention is indicative of the wide range of operative materials and conditions which are involved in the practice of the invention. The following general observations will be illustrative of the relationship of the various components and conditions necessary to achieve the final acid resistant fibers.

HCl, $H_2SO_4$, $HNO_3$ and acetic acid aqueous solutions at a pH range of 1-2 have proven to be effective solutions for the initial leaching process of the invention. When they are employed, the leaching of the fibers is to be conducted at about 40 to 90° C. for about 20 to 180 minutes depending on the accessibility of the fibers. After the rinsing of the fibers to remove any residual acid solution and/or water soluble ions, the fibers should be baked at a temperature above about 400° F. and below the revitrification temperature of the fibers. The time of baking should range from about 20 minutes to about one hour.

The graph of FIG. I is characteristic of the effect of variation in pH of HCl and $H_2SO_4$ solutions on the final acid resistant properties of the fibers and also relates the weight loss of the fibers to pH and final acid resistant properties.

The graph of FIG. I shows that the most acid resistant fibers are produced at a pH range of about 1 to 2 demonstrated by the minimal weight loss of the fiber after treatment with 5 Normal HCl. Additionally, as shown by FIG. I, as the pH of the treating acid solution approaches less than 1, the weight loss of the treated fiber increases, thus reducing the tensile strength of such fiber. Therefore, the most effective pH range for optimum maintenance of tensile strength while maintaining acid resistance is about 1.5 to 2 for $H_2SO_4$ and HCl solutions when the fiber treating conditions are 80° C. for 30 minutes and the heat treatment is at 500° F. for 30 minutes. Acetic acid and $HNO_3$ solutions perform in much the same manner as the HCl and $H_2SO_4$ solutions graphically shown.

The graph of FIG. II demonstrates the effect of cure temperature of the fiber on the final acid resistance of such fiber. Thus, it can be determined from the graph of FIG. II that treatment with 0.1 molar HCl at 57° C. for 30 minutes, and cure temperatures between 400° and 1,200° F. for 30 minutes produces an acceptable acid resistant fiber. $H_2SO_4$, $HNO_3$ and acetic acid perform in much the same manner as HCl. Generally, other acids in the pH range and at the treating temperatures, baking temperatures and time of treatment shown are effective in producing an acid resistant fiber.

There are exceptions to the general treating conditions described above. Exemplary of such deviation is the treatment of the fibers with citric acid. The effective pH range for citric acid is about 1 to 3 while the baking or curing temperatures remain at 400° F. to produce an acceptable acid resistant fiber.

From their illustration, it has been demonstrated that a broad range of materials and conditions can be employed to obtain an acid resistant fiber within the context of the invention.

Having described the basic concept of the invention, the following examples are provided to further illustrate this concept; but by no means are these examples intended to limit the scope of the invention.

EXAMPLE I

An aqueous solution of acetic acid, having a pH at 25° C. of 1.90 ± 0.025 was prepared by adding glacial acetic acid to deionized water which had a pH of 5.80 ± 0.025.

The acetic acid solution was heated to 80° C. ± 2° C. by means of a Bunsen burner. When the temperature of the solution reached 80° C., three samples of weighed, heat cleaned, Hesgon "A" (D-E Fiber) "62" glass fiber tape made by Burlington Glass Fabrics Industries were placed in the solution. The acid solution with the glass fiber tape therein was heated in a water bath at 80° C. ± 2° C. for ½ hour while agitating with a magnetic stirrer.

After ½ hour, the samples were rinsed with deionized water on a Buchner funnel until the pH of the effluent water was the same as the pH influent water. The samples were vacuum dried at 82° F. for ½ hour. The treated glass fiber tape was heated at 500° F. for ½ hour and cooled to room temperature. The samples lost an average of 0.75 percent of their original weight.

The samples were placed in a 5 Normal HCl solution for one hour at 80° C. ± 2° C. while stirring with a magnetic stirrer. The samples were collected and rinsed on a Buchner funnel with deionized water until the pH of the effluent water was equal to the pH of the influent water. After rinsing the samples were dried in a vacuum oven at 82° C. and weighed. The weight loss averaged 0.87 percent, after the 5 Normal HCl test, based on the treated weight of the glass fibers.

Each of the samples, which were ½ inch in width by 7 inches in effective length, were tested for tensile strength on an Instron test instrument. The Instron test instrument was set for a test span of 7 inches and a rate of pull of 5 inches per minute. One end of the glass tape was placed in the top jaw and the opposite end was placed in the bottom jaw. The Instron test instrument was operated until the sample broke and the loading was noted. The samples had an average break load of 32.8 pounds per inch of width.

EXAMPLES II – VI

Samples were made in accordance with the procedure in Example I except that $HNO_3$, HCl, $H_2SO_4$ and $H_2O$ were substituted for the acetic acid in the treating solution. The conditions of the tests employed and the results were as follows:

| | Acid | pH (25° C.) | Weight Loss After 500° F Bake (percent) | Weight Loss After Treating With 5 Normal HCl (percent) | Break Load In Pounds Per Inch Of Width (AVG. Of 3 Samples |
|---|---|---|---|---|---|
| II | $HNO_3$ | 1.90 ± 0.025 | 0.81 | 1.7 | 26.4 |
| III | HCl | 1.90 ± 0.025 | 0.61 | 1.13 | 34.4 |
| IV | $H_2SO_4$ | 1.90 ± 0.025 | 0.69 | 0.29 | 45 |
| V | $H_2O$ | 5.80 ± 0.025 | 0.10 | No treatment | 97 |
| VI | $H_2O$ | 5.80 ± 0.025 | 0.25 | 39.20 | 12.2 |

EXAMPLE VII

A solution of $H_2SO_4$ having a pH of 1.65 was prepared by adding 98 percent $H_2SO_4$ to deionized water. Two samples of weighed "621" glass fibers were added to the acid solution and stirred for ½ hour at 80° C. ± 2° C. The agitation was provided by a magnetic stirrer.

After treatment with the H₂SO₄ solution, the glass fiber samples were rinsed on a Buchner funnel with deionized water until the pH of the effluent water was equal to the pH of the influent water, and vacuum dried in accordance with the procedure of Example I.

The samples were heated to 500° F. for ½ hour, cooled to room temperature and weighed. The samples lost 1.4 percent of their original weight. The samples were placed in a 5 Normal HCl solution at 80° C. ± 2° C. for one hour with stirring. After treatment, the fibers were rinsed on a Buchner funnel with deionized water until the pH of the effluent water equaled the pH of the influent water.

The samples were placed in a vacuum oven at 80° C. ± 2° C. for ½ hour, cooled to room temperature and examined. A weight loss of 0.24 percent, based on the treated weight, was determined by weighing the dried sample. Under microscopic examination, the fibers appeared to be substantially intact, however, isolated areas of a few fibers, minimal acid attack was observed.

EXAMPLE VIII

A sample of "R" glass, having the following composition:

| Components | Percent |
| --- | --- |
| SiO₂ | 58.6 |
| Al₂O₃ | 20.2 |
| MgO | 8.0 |
| CaO | 11.8 |
| TiO₂ | 0.6 |
| B₂O₃ | 0.46 |
| Na₂O | 0.52 | was treated with an H₂SO₄ aqueous solution having a pH of 1.90 and rinsed in accordance with the procedure of Example VII. Subsequently, the sample was again treated with an aqueous H₂SO₄ solution having a pH of 1.65, rinsed, dried, heat cured and tested in accordance with the procedure of Example VII.

The weight loss based on the original weight of the glass fibers between the initial treating and final heating steps of the process was 0.60 percent and 0.04 percent of the treated weight was lost after testing with 5 Normal HCl. Microscopic examination of the glass fibers showed no attack by the 5 Normal HCl test solution whatsoever.

EXAMPLE IX ("R" GLASS CONTROL)

A sample of "R" glass was treated with 5 Normal HCl in accordance with the testing procedure of Example VII. Microscopic examinations showed occasional fibers had slight surface irregularities.

EXAMPLE X

A sample of sodium silicate glass fibers having the following composition:
  30 percent Na₂O
  70 percent SiO₂
was treated with an H₂SO₄ aqueous solution having a pH of 1.65 ± 0.25 at room temperature for 15 minutes. The sample was rinsed and dried in a vacuum over. The treated fiber was heated at 800° F. for ½ hour. A weight loss of 7.16 percent based on the original weight of the glass fibers was observed. The sample was tested with a 5 Normal HCl solution at 80° C. for one hour, rinsed, dried, and weighed. A weight loss of 5.52 percent based on the weight of the treated glass fibers was observed. Microscopic examination showed severe attack in isolated areas of the glass fibers. A sodium silicate fiber treated with 5 Normal HCl without the H₂SO₄ treatment as above described showed substantial weight loss and attack was evidenced throughout the fiber.

EXAMPLE XI

A sample of weighed "621" glass fiber tape was immersed with agitation in an ammonium citrate/citric acid solution having a pH of 3.00 for ½ hour at 80° C. The sample was rinsed on a Buchner funnel until the pH of the effluent water was equal to the pH of the influent water and dried in a vacuum over at 82° F. for ½ hour. The sample was baked at 500° F. for ½ hour. A weight loss of 0.77 percent was observed. The sample was immersed in a 5 Normal HCl solution at 80° C. for 1 hour. A weight loss of 0.45 percent based on the treated fiber was observed after rinsing and drying. Microscopic examination of the fibers showed very minimal attack of the 5 Normal HCl solution in isolated areas of some of the fibers.

EXAMPLE XII

A solution of 0.01 molar Fe(NO₃)₃ was prepared by adding Fe(NO₃)₃ to deionized water containing 1 molar acetic acid. Two samples of weighed "621" glass fiber tape were added to the solution and stirred at 80° C. ± 2° C. for ½ hour; the agitation being provided by a magnetic stirrer. After treatment with the salt solution, the glass fiber samples were rinsed on a Buchner funnel with deionized water until the pH of the effluent water was equal to the pH of the influent water and dried in a vacuum over at 82° F. for ½ hour.

The samples were heated at 500° F. for ½ hour and cooled to room temperature. The samples were placed in a 5 Normal HCl solution at 80° C. ± 2° C. for one hour with stirring. After treatment, the fibers were rinsed on a Buchner funnel with deionized water until the pH of the effluent water equaled the pH of the influent water. The samples were placed in a vacuum over at 80° C. ± 2° C. for ½ hour, cooled to room temperature, weighed and examined. Each sample demonstrated a total weight loss of 1.35 percent based on post treatment weight. Under microscopic examination, the majority of the fibers appeared to be uneffected by the hydrochloric acid solution. However, in isolated areas, the acid attacked the glass fibers.

EXAMPLE XIII

Example XII was repeated except that the heat treatment was at a temperature of 400° F. A total loss of 35 percent by weight was observed, and microscopic examination showed the fiber was attacked substantially throughout its entire diameter.

EXAMPLE XIV

A 0.05 molar oxalic acid, 0.1 molar Cr(NO₃)₃ . 9 H₂O, 0.1 molar Fe(NO₃)₃ . 9 H₂O aqueous solution having a pH of 0.90 ± 0.25 was prepared. Two samples of weighed "621" glass fibers were added to the above salt solution and stirred at 50° C. ± 1° C. for ½ hour; the agitation being provided by a magnetic stirrer. After treatment with the salt solution, the glass fiber samples were rinsed on a Buchner funnel until the pH of the effluent water was equal to the pH of the influent water. The samples were dried in a vacuum oven at 82° F. for ½ hour. The samples were heated to 500° F. for ½ hour, cooled to room temperature and weighed. A weight loss based on the original weight of the glass fibers of 1.54 percent was observed. The samples were placed on a 5 Normal HCl solution at 80° C. ± 2° C. for one hour with stirring. After the treatment, the fibers were rinsed in accordance with the procedure of Example XII, dried and weighed. A weight loss of 0.4 percent was observed based on the weight of the treated glass fibers. Microscopic examination of the glass fibers showed minimal attack at isolated areas on the glass fibers.

EXAMPLE XV

A solution of 0.01 molar $ZnCl_2$ in 0.1 molar HCl was prepared for treating glass fiber tape. A sample of weighed "621" glass fibers were added to the solution and stirred for ½ hour at 80° C. ± 2° C., the agitation being provided by a magnetic stirrer. After treatment, with the above solution, the glass fiber sample was rinsed on a Buchner funnel with deionized water, until the pH of the effluent water was equal to the pH of the influent water. The sample was dried in a vacuum oven at 82° F. for ½ hour. The sample was heated to 400° F. for ½ hour, cooled to room temperature, and weighed. The sample lost 5.45 percent of its original weight. The sample was placed in a 5 Normal HCl solution of 80° C. ± 2° C. for one hour with stirring. After treatment, the sample was rinsed on a Buchner funnel with deionized water until the pH of the effluent water was equal to the pH of the influent water. The sample was placed in a vacuum oven at 80° C. ± 2° C. for ½ hour, cooled to room temperature, weighed and examined. A weight loss of 0.63 percent based on the treated weight of the glass fibers was observed. Microscopic examination showed no attack whatsoever on the glass fiber surface.

EXAMPLE XVI

Example XV was repeated except that the heat treatment of the glass fibers was made at 300° F. for ½ hour instead of 400° F. for ½ hour. The weight loss after treatment with a 5 Normal HCl solution was observed at 13.79 percent and microscopic examination showed substantial attack by the HCl solution of the glass fibers.

EXAMPLE XVII

A solution of 0.01 molar sodium metaphosphate and 0.01 molar HCl was prepared and used for treating a sample of "621" glass fiber tape in accordance with the procedure of Example XVI except that the heat treatment was at 400° F. for ½ hour. Weight loss observed after heat treatment was 4 percent based on the original weight of the glass fibers. A weight loss of 0.69 percent by weight based on the weight of the treated glass fibers was observed after testing with 5 Normal HCl solution. Microscopic examination of the glass fibers showed an infinitesimal amount of attack on the glass fiber surface by the HCl solution.

EXAMPLE XVIII

Example XVII was repeated except that heat treatment was at 300° F. for ½ hour. A weight loss based on the treated glass fibers after testing with 5 Normal HCl solution, was 5.97 percent. On microscopic examination, substantial attack by the HCl solution was observed.

EXAMPLE XIX

A solution of 0.01 molar $Cu(NO_3)_2$ in 0.01 molar HCl was prepared for treating "621" glass fibers in accordance with the procedure of Example XVIII. After heat treatment at 400° F. for ½ hour, a weight loss of 1.17 percent was observed. After testing with 5 Normal HCl solution, a weight loss based on a treated weight of glass fibers of 1.63 percent was observed. Under microscopic examination, minimal attack of the 5 Normal HCl solution on glass fiber surface was observed in isolated areas.

EXAMPLE XX

A 0.01 molar $Al(NO_3)_3 \cdot 9 H_2O$, and 0.1 molar HCl was prepared for treatment of "621" glass fiber tape. The "621" glass fiber tape was added to the solution and stirred by means of a magnetic stirrer for ½ hour at 57° C. ± 1° C., rinsed, dried and weighed in accordance with the procedures of the previous examples. A weight loss of 2.81 percent based on the original weight of the glass fibers was observed after heat treatment at 400° F. for ½ hour. After testing with 5 Normal HCl solution in accordance with the procedure of the previous examples, the sample showed a weight loss based on the treated fiber weight of 0.68 percent. Microscopic examination showed minimal attack at isolated areas of the glass fibers.

EXAMPLE XXI

A sample of "621" glass fiber tape was treated with an $H_2SO_4$ solution having a pH of 1.65 at 80° C., rinsed, and dried in accordance with the procedures of the previous examples. A weight loss of 1.87 percent was observed based on the original glass fiber weight. The sample was heated at 300° F. for four hours, cooled to room temperature and tested with the 5 Normal HCl solution for one hour at 80° C. A weight loss of 0.44 percent based on treated weight was observed. Microscopic examination of the tested glass fibers showed minimal attack in isolated areas.

The above examples are illustrative of the broad range of components useful in the process for preparing the acid resistant fibers of the invention. Various glass fiber compositions in the above examples have been used to illustrate the versatility of the process. Additionally, a plurality of acidic salt solutions and acid solutions have been shown to have utility in making the acid resistant fibers. The duration and degree of the heat treatment requisite to render the various fibers acid resistant has been shown to be of a broad range. Therefore, the invention is not intended to be limited by the illustrative embodiments except insofar as is set forth in the accompanying claims.

I claim:

1. A method of preparing a dual composition, acid resistant glass fiber comprising contacting the surface of the siliceous glass fiber with an aqueous acidic solution at a pH and temperature and for a period of time sufficient to increase the silica content of said surface without substantially reducing the tensile strength of said fiber and producing a glass fiber having an overall $SiO_2$ content of 52 to 64 percent by weight, removing said aqueous acid solution from the surface of said fiber and heating the fiber after removing said acid solution for a time and at a temperature sufficient to render the surface of said fiber acid resistant.

2. The method of claim 1 wherein said aqueous acid solution has a pH of 1 to 3.

3. A glass fiber produced according to the method of claim 2.

4. The method of claim 1 wherein said heating step is conducted at temperature between 300° F. and a temperature below the revitrification temperature of said fiber and is conducted for about 10 to about 60 minutes.

5. The method of claim 1 wherein the aqueous acid solution is selected from the group consisting of HCl, $H_2SO_4$, $HNO_3$ and acetic acid containing aqueous solutions having a pH of 1 to 2.2.

6. The method of claim 5 wherein the aqueous acid solutions contain $ZnCl_2$.

7. The method of claim 5 wherein the aqueous acid solution contains $Fe(NO_3)_3$.

8. The method of claim 1 wherein the aqueous acid solution contains oxalic acid and $Cr(NO_3)_3$.

9. The method of claim 1 wherein the heating step is conducted at temperature between 400° F. and a temperature below the revitrification temperature of said fiber and is conducted for 20 minutes to 60 minutes.

10. The method of claim 1 wherein said aqueous acid solution is a citric acid containing solution having a pH of 1 to 3.

11. The method of claim 1 wherein said heating step is at a temperature between 300° F. and below the revitrification temperature of said glass fiber and is conducted for between 10 to 60 minutes.

12. A glass fiber produced according to the method of claim 1.

* * * * *